(12) United States Patent
Prud'Homme-Lacroix

(10) Patent No.: US 9,284,059 B2
(45) Date of Patent: Mar. 15, 2016

(54) ROTARY WING ROTORCRAFT HAVING A PLURALITY OF PROPELLERS

(71) Applicant: AIRBUS HELICOPTERS, Marignane (FR)

(72) Inventor: Pierre Prud'Homme-Lacroix, Vitrolles (FR)

(73) Assignee: Airbus Helicopters, Marignane (FR)

( * ) Notice: Subject to any disclaimer, the term of this patent is extended or adjusted under 35 U.S.C. 154(b) by 167 days.

(21) Appl. No.: 14/291,993

(22) Filed: May 30, 2014

(65) Prior Publication Data

US 2014/0353420 A1    Dec. 4, 2014

(30) Foreign Application Priority Data

May 30, 2013   (FR) ...................................... 13 01228

(51) Int. Cl.
| | | |
|---|---|---|
| *B64C 27/26* | (2006.01) | |
| *B64D 31/00* | (2006.01) | |
| *B64C 27/82* | (2006.01) | |
| *B64C 27/22* | (2006.01) | |
| *B64D 27/02* | (2006.01) | |
| *B64D 27/22* | (2006.01) | |

(52) U.S. Cl.
CPC ................ *B64D 31/00* (2013.01); *B64C 27/22* (2013.01); *B64C 27/26* (2013.01); *B64C 27/82* (2013.01); *B64D 27/02* (2013.01); *B64D 27/22* (2013.01)

(58) Field of Classification Search
CPC ........ B64C 27/22; B64C 27/26; B64C 27/82; B64C 2027/8236; B64D 27/06; B64D 2027/005; B64D 31/00
See application file for complete search history.

(56) References Cited

U.S. PATENT DOCUMENTS

| 1,509,344 A | | 9/1924 | Dornier | |
|---|---|---|---|---|
| 1,957,277 A | * | 5/1934 | Leray | ................................ 244/5 |
| 3,458,160 A | * | 7/1969 | Marchetti | ........................ 244/6 |

(Continued)

FOREIGN PATENT DOCUMENTS

DE           4443731           6/1996

(Continued)

OTHER PUBLICATIONS

French Search Report for FR 1301228, Completed by the French Patent Office on Feb. 3, 2014, 6 Pages.
Office Action dated Mar. 20, 2015 of corresponding U.S. Appl. No. 14/291,655, 16 pages.

*Primary Examiner* — Tien Dinh
*Assistant Examiner* — Christopher Hutchens
(74) *Attorney, Agent, or Firm* — Brooks Kushman P.C.

(57) ABSTRACT

A hybrid aircraft (1) having a fuselage (2) extending longitudinally along an anteroposterior plane of symmetry (PSYM) from the rear (4) of the aircraft (1) towards the front (3) of the aircraft (1). The aircraft (1) has a rotary wing (6) carried by the fuselage (2) of a lift surface (10) fastened to the fuselage (2) and constituted by a first half-wing (11) and a second half-wing (12). The aircraft (1) has a first propulsion unit (30) carried by the first half-wing (11) and a second propulsion unit (40) carried by the second half-wing (12). Each propulsion unit (30, 40) includes at least one tractor propeller (31, 32, 41, 42), and at least one propulsion unit has two propellers (31-32, 41-42) on the same axis, each of said propellers rotating about an axis of rotation (AX) that is offset transversely from said anteroposterior plane of symmetry (PSYM).

20 Claims, 2 Drawing Sheets

(56) References Cited

U.S. PATENT DOCUMENTS

| | | |
|---|---|---|
| 5,782,427 A | 7/1998 | Hermach |
| 8,186,629 B2 * | 5/2012 | Queiras et al. ............... 244/194 |
| 2002/0011539 A1 * | 1/2002 | Carter, Jr. .................... 244/6 |
| 2011/0150645 A1 * | 6/2011 | Moore et al. .................. 416/1 |
| 2013/0082135 A1 * | 4/2013 | Moret ........................... 244/6 |

FOREIGN PATENT DOCUMENTS

| | | | |
|---|---|---|---|
| FR | 875648 | | 9/1942 |
| GB | 258595 | * | 11/1927 |
| GB | 564061 | * | 9/1944 |
| GB | 895590 | * | 5/1962 |
| JP | 2001071998 | | 3/2001 |

* cited by examiner

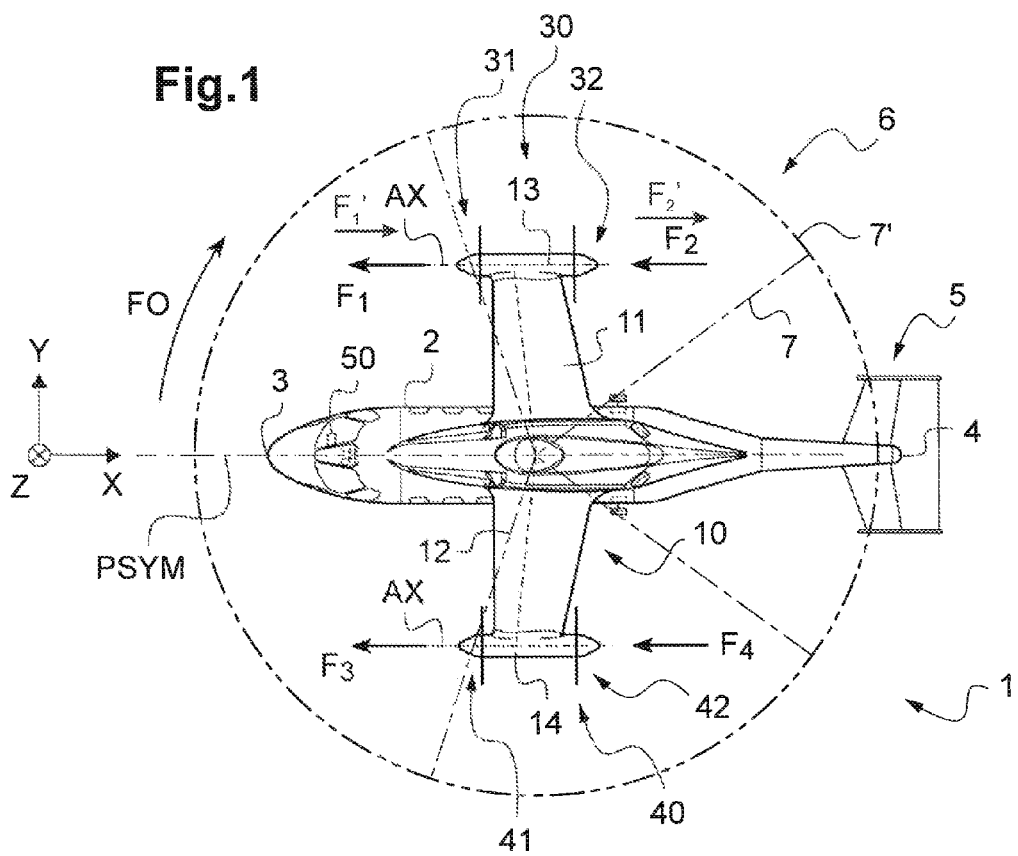
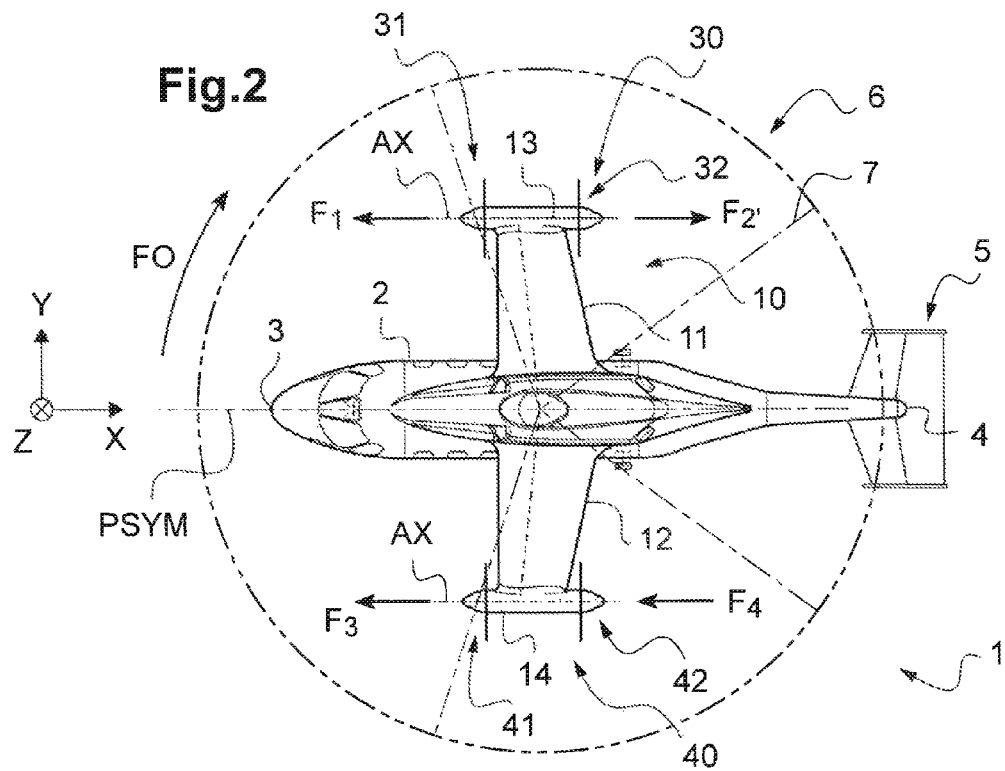

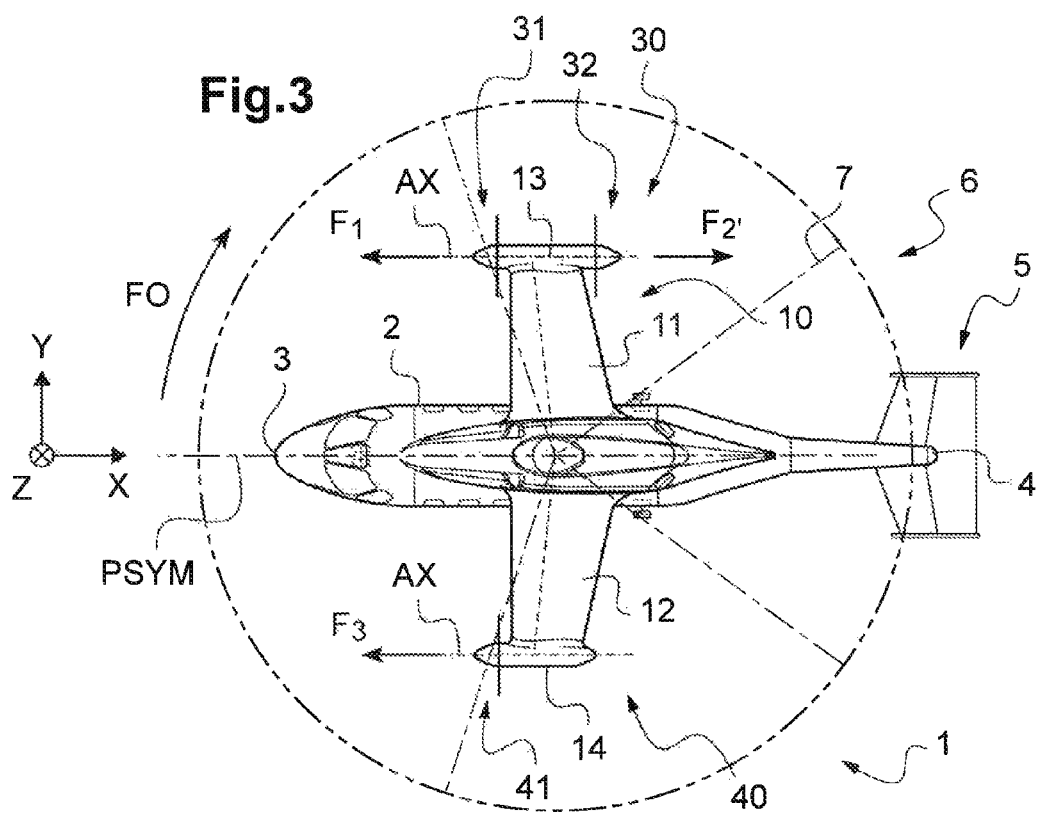
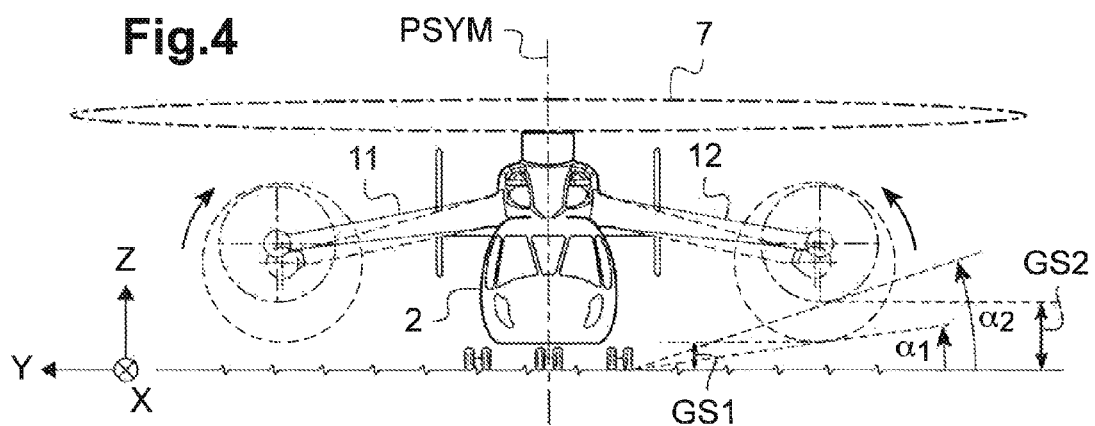
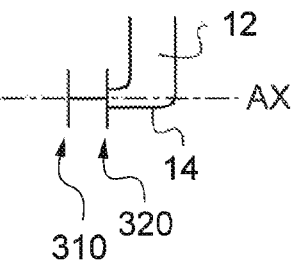

ROTARY WING ROTORCRAFT HAVING A PLURALITY OF PROPELLERS

CROSS REFERENCE TO RELATED APPLICATION

This application claims priority to French patent application No. FR 13 01228 filed on May 30, 2013, the disclosure of which is incorporated in its entirety by reference herein. This application also is related to a U.S. application entitled "A Rotary Wing Rotorcraft Having A Plurality Of Propellers", U.S. application Ser. No. 14/291,655, filed on May 30, 2014, which also claims priority to French patent application No. FR 13 01228.

BACKGROUND OF THE INVENTION (1) Field of the Invention

The invention relates to a rotary wing rotorcraft having a plurality of propellers, and to a method of optimizing such a rotorcraft.

The invention thus lies in the technical field of rotorcraft, and in particular of rotorcraft having a high forward speed and including at least one lift rotor and at least one propeller.

(2) Description of Related Art

Conventionally, a rotorcraft has a rotary wing that is carried by a fuselage. The rotary wing provides at least some of the lift of the aircraft, and possibly at least some of its propulsion. Such a rotary wing thus includes at least one rotor referred to, for convenience, as a "lift rotor".

Rotorcraft are also known that have both a rotary wing and a fixed wing carrying at least one propeller arranged beside a fuselage. For example, two propellers may be arranged on either side of the fuselage. For this purpose, each propeller is carried by a half-wing extending transversely from the fuselage of the aircraft.

The propellers then contribute to propelling the aircraft. Furthermore, the propellers can generate torque on the fuselage in order to balance the torque from the main rotor and in order to control yaw movement of the aircraft.

Such a rotorcraft is thus referred to as a "hybrid" aircraft for convenience insofar as a rotary wing is associated with at least one propeller and with at least one fixed wing.

Such hybrid aircraft are particularly advantageous. The use of propellers makes it possible in particular to achieve high forward speeds and to cover considerable distances.

Nevertheless, making a hybrid aircraft can raise difficulties in terms of design dimensions.

The aircraft must present a safety distance between the propellers and the rotary wing, and also between the propellers and the ground. Under such circumstances, it can be difficult to arrange propellers that are suitable for maximizing the performance of the aircraft.

Ground clearance between the ground and propellers that are relatively large may turn out to be marginal in terms of the aircraft having an acceptable roll angle on the ground.

In the process of designing an aircraft, the rotary wing is given dimensions to ensure adequate lift. The rotary wing of a hybrid aircraft (like that of a helicopter for example) then exerts a yaw torque on the fuselage.

In order to compensate that torque, the manufacturer needs to find a good compromise between the diameter of the propellers and the distance between the propellers and the axis of the aircraft. Nevertheless, the blades of a rotary wing tend to flex while they are in use, in particular during stages of take-off and landing. The amount of flexing increases with increasing distance from the axis of rotation of the rotary wing. This phenomenon is additional to the flapping movement of the blades.

Consequently, by locating the propellers of a hybrid aircraft far away from the fuselage, the distance between a propeller and the blades of the rotary wing is reduced. This distance is referred to as "rotor clearance" by analogy with the term "ground clearance", which designates the distance between a member of the aircraft and the ground when the aircraft is standing on the ground.

A manufacturer thus tends to space each propeller away from the fuselage, while also locating it closer to the ground in order to maintain an acceptable amount of "rotor clearance".

In order to obtain an acceptable compromise in the design of the aircraft, the manufacturer can thus increase the lift generated by the rotary wing, and can locate the propulsion propellers further away from the fuselage by bringing them closer to the ground.

Nevertheless, by bringing the propellers closer to the ground, the angle of inclination of a straight line passing through a low point of a propeller and a point of contact of the landing gear with the ground is made smaller. In other words, the acceptable roll angle on the ground for the aircraft is made smaller.

Consequently, in order to maintain an acceptable roll angle, the manufacturer may modify the height of the fuselage above the ground in order to increase the ground clearance of the propeller. The roll angle is thus increased.

The manufacturer may also provide outriggers close to the propellers in order to avoid a propeller making contact with the ground.

An outrigger is a piece of landing gear located under a wing. Outrigger technology can lead to difficulties, e.g. requiring the wing carrying the propellers to be reinforced and increasing the overall weight of the aircraft.

In order to compensate for a loss of stability resulting from this increased height, the width of the fuselage is optionally also significantly increased, thereby also leading to an increase in weight.

Nevertheless, the hybrid aircraft then presents a fuselage of large frontal area. For convenience, the term "frontal area" is used to designate the area of the fuselage that comes into contact with air as a result of forward flight. The resulting increase in the drag of the hybrid aircraft then runs the risk of degrading its performance.

In this context, the invention thus lies in the narrow technical field of rotorcraft having both a rotary wing and propellers, and it seeks to avoid such degraded performance.

In the technological background remote from the technical field of the invention, airplanes are known presenting a so-called "push-pull" configuration. It can be understood that an airplane does not form part of the technical field of the invention insofar as an airplane is not subjected to constraints resulting in particular from arranging a rotary wing.

Such an airplane has two propellers arranged one behind the other in an anteroposterior plane of symmetry of the airplane. More precisely, the airplane has a tractor propeller, also referred to as a "forward-mounted" propeller, and a pusher propeller, also referred to as a "backward-mounted" propeller. A tractor propeller faces towards the front of the aircraft while a pusher propeller faces towards the rear of the aircraft. Both propellers then generate thrust towards the front of the aircraft.

That push-pull concept seeks to minimize the drag generated by the two propellers by placing one behind the other. Furthermore, that concept seeks to make it easier to fly the airplane in the event of one of the propellers failing. That concept requires the propellers to be positioned in a central plane in order to avoid destabilizing the aircraft in the event of a failure of one propeller.

Under such circumstances, the push-pull concept does not provide any teaching for solving problems associated with ground clearance and with rotor clearance in a hybrid aircraft.

Reference may also be made to Documents U.S. Pat. No. 1,509,344 and U.S. Pat. No. 5,782,427, for example. Document DE 4 443 731 also describes an engine with twin propellers arranged in the plane of symmetry of an airplane.

Document FR 875 648 describes a multi-engined airplane seeking to leave clear the nose of the fuselage. That airplane has a tail propeller, and possibly two engine-and-propeller units in tandem. That document does not mention the problems of ground clearance and rotor clearance, and it therefore does not lie in the technical field of the invention.

Also known are the following documents: U.S. Pat. No. 1,957,277 and JP 2001/071998.

BRIEF SUMMARY OF THE INVENTION

An object of the present invention is thus to propose a rotorcraft having a rotary wing and propulsive propellers, while tending to optimize ground clearance and frontal area.

According to the invention, a hybrid aircraft is provided with a fuselage extending longitudinally along an anteroposterior plane of symmetry from the rear of the aircraft towards the front of the aircraft, said aircraft having a rotary wing carried by the fuselage, said aircraft being provided with a lift surface fastened to the fuselage and constituted by a first half-wing and a second half-wing situated on either side of the fuselage, said aircraft having a first propulsion unit carried by the first half-wing and a second propulsion unit carried by the second half-wing. For example, the first propulsion unit is carried by a first tip of the first half-wing and the second propulsion unit is carried by a second tip of the second half-wing.

The terms "front" and "rear" should be considered relative to the forward direction of the aircraft, the term "front" making reference to a front end and the term "rear" making reference to a rear end.

In remarkable manner, each propulsion unit includes at least one tractor propeller, and at least one propulsion unit has two propellers on the same axis, each of said propellers rotating about an axis of rotation that is offset transversely from said anteroposterior plane of symmetry.

Consequently, the aircraft has a first propulsion unit with two propellers on a common axis, and a second propulsion unit with at least one propeller.

The propellers may be set into rotation by a common power plant, which power plant drives each of the propellers via a power transmission system.

Under such circumstances, each propeller may present a diameter that is smaller than in a conventional hybrid aircraft. Reducing propeller diameter makes it possible to restore comfortable ground clearance between the ground and the propellers.

This reduction in diameter and this configuration are not in any way obvious.

Firstly, the propellers are remote from the anteroposterior plane of symmetry of the aircraft, unlike push-pull airplanes.

Secondly, it might be thought that in order to obtain equivalent performance between an aircraft having large propellers of large diameter and an aircraft having small propellers of small diameter, it would be necessary to increase very significantly the power that needs to be delivered in order to drive the propellers.

However, an increase of no more than about 5% of the power needed during level flight can suffice to reduce the diameter of a propeller by one-third, thereby almost tripling the ground clearance and the roll angle of the aircraft.

These figures are given by way of example in order to illustrate the feasibility and the surprising effects of the invention.

The aircraft may also include one or more of the following additional characteristics.

Thus, two propellers of a single propulsion unit may be arranged to be contrarotating.

In a variant or in addition, two propellers of a single propulsion unit are arranged to rotate in the same direction.

Furthermore, two propellers of a single propulsion unit are optionally situated on the same side of a half-wing, i.e. either upstream from the leading edge of the half-wing, or downstream from the trailing edge of the half-wing.

Two propellers of a single propulsion unit may also be situated on opposite sides of the same half-wing.

In a first embodiment, each propulsion unit includes a first propeller and a second propeller on the same axis with each generating thrust directed towards the front of the aircraft in a normal thrust mode of operation, and thrust directed towards the rear of the aircraft in a reverse thrust mode of operation.

For example, each propulsion unit includes a tractor propeller and a pusher propeller arranged back to back.

It should be recalled that a single propeller can generate thrust in opposite directions, e.g. as a function of the pitch of blades of that propeller.

Thus, a propeller can operate either in a "normal" thrust mode of operation or in a "reverse" thrust mode of operation.

Under such circumstances, the aircraft may include propeller control means that act:

during hovering flight, to cause the first propeller and the second propeller of the first propulsion unit to operate in the reverse thrust mode of operation, and to cause the first propeller and the second propeller of the second propulsion unit to operate in the normal thrust mode of operation; and during forward flight, to cause the first propeller and the second propeller in each of the propulsion units to operate in the normal thrust mode of operation.

Thus, during a stage of hovering flight, one propulsion unit generates thrust in one direction while the other propulsion unit generates thrust in another direction, in particular in order to oppose the yaw torque exerted by the lift rotor on the fuselage.

In contrast, during level flight and more particularly during forward level flight, all of the propellers contribute to propelling the hybrid aircraft.

In a second embodiment, the first propulsion unit includes both a first propeller and a second propeller on the same axis arranged back to back and suitable in a normal thrust mode of operation respectively for generating thrust towards the front of the aircraft and thrust directed towards the rear of the aircraft, this first propulsion unit always presenting one propeller that generates no thrust during hovering flight.

The first propulsion unit can thus include two tractor propellers arranged back to back.

The first propeller of the first propulsion unit generates no thrust during hovering flight, and the second propeller of the first propulsion unit generates no thrust in forward flight.

Alternatively, the first propeller of the first propulsion unit generates no thrust during hovering flight, and the second propeller of the first propulsion unit operates in the reverse thrust mode of operation in forward flight.

Under such circumstances, the first propulsion unit does not possess two propellers delivering opposing thrusts at all times.

In a first variant of the second embodiment, the second propulsion unit includes both a first propeller and a second propeller on the same axis, each generating thrust directed towards the front of the aircraft in a normal thrust mode of operation.

Under such circumstances, it is possible to envisage mounting a tractor propeller and a pusher propeller back to back.

This first variant of the second embodiment enables thrust to be obtained that is equivalent to that of a conventional hybrid aircraft, providing power is increased by about 8% during level flight, with power being reduced by about 9% during hovering flight. These figures are given by way of example.

Thus, using two propellers that are designed to generate thrust in opposite directions turns out not only to be possible, which is in itself surprising, but also advantageous.

In a second variant of the second embodiment, the second propulsion unit includes a single propeller that generates thrust directed towards the front of the aircraft in a normal thrust mode of operation.

This second variant of the second embodiment makes it possible to obtain thrust equivalent to that of a conventional hybrid aircraft, providing power is increased by about 9% during level flight, with power being reduced by about 10% during hovering flight. These figures are given by way of example.

It should be observed that during forward flight, the second propeller may either be set to be transparent, or optionally it may operate in a reverse thrust mode of operation in order to contribute to propulsion.

Furthermore, when the rotary wing has a lift rotor that rotates in the clockwise direction when seen from above, the first propulsion unit is situated on the right of the fuselage when seen from above, the second propulsion unit being situated on the left of the fuselage when seen from above. Or using conventional terminology, the first propulsion unit is then situated on the starboard side of the fuselage while the second propulsion unit is situated on the port side of the fuselage.

In contrast, when the rotary wing has a lift rotor rotating counterclockwise as seen from above, the first propulsion unit is situated on the left of said fuselage as seen from above, the second propulsion unit being situated on the right of the fuselage as seen from above.

In addition to an aircraft, the invention provides a method performed by the aircraft.

Thus, the invention provides a method of optimizing the ground clearance of a hybrid aircraft provided with a fuselage extending longitudinally along an anteroposterior plane of symmetry from the rear of the aircraft towards the front of the aircraft, said aircraft having a rotary wing carried by the fuselage, said aircraft being provided with a lift surface fastened to the fuselage and constituted by a first half-wing and a second half-wing situated on either side of the fuselage, said aircraft having a first propulsion unit carried by the first half-wing and a second propulsion unit carried by the second half-wing.

This method comprises the following steps:

fitting each propulsion unit with at least one propeller; and fitting at least one propulsion unit with two propellers that are on the same axis in order to minimize the diameter of the propellers.

By way of example, the first propulsion unit is fitted with both a first propeller and a second propeller on the same axis and mounted back to back, which propellers are suitable for generating respectively thrust that is directed towards the front of the aircraft and thrust that is directed towards the rear of the aircraft in a normal thrust mode of operation; and the first propeller of the first propulsion unit is set to be transparent during hovering flight so that the first propeller does not generate any thrust; and the second propeller of the first propulsion unit is set to be transparent during forward flight so that the second propeller generates no thrust, or else the second propeller of the first propulsion unit is caused to operate in a reverse thrust mode of operation.

A propeller may be set to be transparent by adjusting the pitch of the blades of the propeller so that the airfoils of the blades present an angle of incidence of zero relative to the incident air.

BRIEF DESCRIPTION OF THE SEVERAL
VIEWS OF THE DRAWINGS

The invention and its advantages appear in greater detail from the context of the following description with embodiments given by way of illustration and with reference to the accompanying figures, in which:

FIG. 1 is a view of a hybrid helicopter in a first embodiment;

FIG. 2 is a view of a hybrid helicopter in a first variant of a second embodiment;

FIG. 3 is a view of a hybrid helicopter in a second variant of a second embodiment;

FIG. 4 is a view explaining the improvement made available by the invention; and FIG. 5 is a view showing a propulsion unit having two propellers arranged on the same side of a wing.

Elements present in more than one of the figures are given the same references in each of them.

DETAILED DESCRIPTION OF THE SEVERAL
VIEWS OF THE DRAWINGS

Three mutually orthogonal directions X, Y, and Z are shown in some of FIGS. 1 to 4.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

FIG. 1 shows a hybrid aircraft 1 in a first embodiment.

Independently of the embodiment, the aircraft 1 comprises a fuselage 2 extending along an anteroposterior plane of symmetry PSYM from a nose 3 at the front of the aircraft 1 towards the rear 4 of the aircraft. The rear 4 of the aircraft is in the form of a tail end conventionally provided with stabilizer surfaces.

The aircraft 1 has a rotary wing 6. This rotary wing 6 includes at least one lift rotor provided with a plurality of blades 7 that describe a rotor disk 7' when they are in rotation. The rotary wing is carried by the fuselage 2.

Furthermore, the aircraft 1 is provided with a lift surface 10 extending transversely on either side of the fuselage 2. The lift surface then comprises a first half-wing 11 extending laterally from the fuselage from a first side of the aircraft 1 to a first tip 13. Likewise, the lift surface has a second half-wing 12 extending laterally from the fuselage on a second side of the aircraft 1 to a second tip 14.

The ends of the half-wings are referred to respectively as the "first" tip and as the "second" tip for convenience in order to distinguish them easily.

The lift surface 10 may be a wing that is continuous or discontinuous.

Furthermore, each half-wing carries a propulsion unit with a propeller. The first half-wing 11 then carries a first propulsion unit 30, e.g. at the first tip 13, and the second half-wing 12 carries a second propulsion unit 40, e.g. at the second tip 14.

Each propulsion unit 30, 40 includes at least one propeller, in particular a tractor propeller generating thrust F1, F3 towards the front 2 of the aircraft during a normal thrust mode of operation.

Furthermore, the aircraft 1 includes at least one propulsion unit having two propellers on the same axis.

In particular, the first propulsion unit is provided with two propellers.

When the rotary wing 6 comprises a lift rotor that rotates in the clockwise direction F0 when seen from above, as in the example of FIG. 1, then the first propulsion unit is situated on the right of the fuselage as seen from above, i.e. on the starboard side, and the second propulsion unit is situated on the left of the fuselage as seen from above, i.e. on the port side.

Conversely, if the rotary wing 6 comprises a lift rotor rotating in the counterclockwise direction as seen from above, then the first propulsion unit is situated on the left of the fuselage as seen from above, i.e. on the port side, and the second propulsion unit is situated on the right of the fuselage as seen from above, i.e. on the starboard side.

Furthermore, two propellers in a single propulsion unit may be arranged so as to be contrarotating, or so as to rotate in the same direction.

Furthermore, two propellers 310, 320 in a single propulsion unit may be longitudinally situated on the same side of a half-wing 12 as shown in FIG. 5. The same may be embodied for the first tip 13. In other embodiments, the two propellers 31, 32/41, 42 are situated on opposite sides, i.e. forwardly/rearward, of a single half-wing 11, 12 as shown in FIGS. 1 to 3.

Each propeller of the aircraft rotates about an axis of rotation AX that does not lie in the anteroposterior plane of symmetry PSYM of the aircraft 1.

For this purpose, each propeller may be associated with a respective driving engine forming part of a power plant, or it may be rotated by at least one engine that is remote therefrom via a power transmission drive train.

In the invention, a manufacturer thus fits each propulsion unit with at least one propeller, and in particular provides at least one propulsion unit with two propellers on the same axis.

With reference to FIG. 4, this method serves to enable the diameters of the propellers to be made smaller compared with a conventional hybrid aircraft.

FIG. 4 shows the propellers of a hybrid aircraft of the invention in chain-dotted lines, and the propellers of a conventional hybrid aircraft in dashed lines.

It can be seen that the invention makes it possible to obtain propellers of small diameter. Under such circumstances, the ground clearance GS2 of the propellers of the invention can be greater than the ground clearance GS1 of prior art propellers.

Likewise, the roll angle on the ground $\alpha 2$ made possible by the invention is greater than the roll angle on the ground $\alpha 1$ that is possible with a conventional hybrid aircraft.

FIG. 1 shows a first embodiment.

In this first embodiment, the first propulsion unit 30 includes both a first propeller 31 and a second propeller 32 on the same axis. Likewise, the second propulsion unit 40 includes both a first propeller 41 and a second propeller 42 on the same axis.

All of the propellers generate thrust F1, F2, F3, F4 that is directed towards the front 3 of the aircraft 1 in a normal thrust mode of operation, and thrust directed towards the rear 4 of the aircraft 1 in a reverse thrust mode of operation. Thus, the first propellers 31 and 41 may be tractor propellers arranged on the leading edges of the half-wings, with the second propellers 32 and 42 being pusher propellers arranged on the trailing edges of the half-wings.

Under such circumstances, and depending on the method applied, the pilot while hovering can cause the propellers 31 and 32 of the first propulsion unit 30 to operate in a reverse thrust mode of operation so that the propellers 31 and 32 generate thrust F1' and F2' that is directed towards the rear 4 of the aircraft 1 and can cause the propellers 41 and 42 of the second propulsion unit 40 to operate in a normal thrust mode of operation. This action seeks to counter the yaw torque generated by the rotary wing.

Consequently, the aircraft may include control means 50 operable by the pilot to control the mode of operation of the propellers. Such control means may be means for controlling the thrust of the propellers by acting on the collective pitch of the propeller blades.

In contrast, during forward flight, and in particular during level flight, the pilot causes all of the propellers 31, 32, 41, and 42 to operate in the normal thrust mode of operation.

FIGS. 2 and 3 show a second embodiment.

In this second embodiment, the first propulsion unit is provided both with a first propeller 31 and with a second propeller 32 that are on the same axis and that are arranged back to back. The first propeller produces thrust F1 directed towards the front 3 of the aircraft while the second propeller produces thrust F2' directed towards the rear 4 of the aircraft in a normal mode of operation for these propellers.

The first propeller 31 of the first propulsion unit 30 is a tractor propeller arranged on the leading edge of the first half-wing, and the second propeller 32 of the first propulsion unit 30 is a tractor propeller arranged on the trailing edge of the first half-wing.

In contrast, still in hovering flight, this first propulsion unit generates no thrust.

In particular, the first propeller 31 of the first propulsion unit 30 generates no thrust during hovering flight by being set to be transparent.

In forward flight and in particular in level flight, the second propeller 32 of the first propulsion unit 30 may either operate in reverse thrust mode, or else it may generate no thrust by being set to be transparent.

As a result, the pilot sets the first propeller 31 of the first propulsion unit 30 to be transparent during hovering flight. The second propeller of the second propulsion unit then generates thrust towards the rear of the aircraft.

In contrast, during forward flight the pilot causes the first propeller of the first propulsion unit to produce thrust towards the front of the aircraft by means of this first propeller. However, the pilot may either set the second propeller 32 of the first propulsion unit 30 to be transparent so that the second propeller 32 generates no thrust, or else may cause the second propeller 32 of the first propulsion unit 30 to operate in a reverse thrust mode of operation.

In the first variant of the second embodiment as shown in FIG. 2, the second propulsion unit 40 includes both a first propeller 41 and a second propeller 42 on the same axis and generating respective thrusts F3 and F4 in flight both directed towards the front 3 of the aircraft 1 in a normal thrust mode of operation.

The first propeller 41 of the second propulsion unit 40 is a tractor propeller arranged at the leading edge of the second half-wing, and the second propeller 42 of the second propeller unit 40 is a pusher propeller arranged at the trailing edge of the second half-wing.

In the second variant of the second embodiment, as shown in FIG. 3, the second propulsion unit 40 has a single propeller 41 that, in flight, generates thrust F3 directed towards the front 3 of the aircraft 1 in the normal thrust mode of operation. The single propeller 41 is a tractor propeller arranged at the leading edge of the second half-wing in the example shown.

Naturally, the present invention may be subjected to numerous variants as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A hybrid aircraft having a fuselage extending longitudinally along an anteroposterior plane of symmetry (PSYM) from the rear of the aircraft towards the front of the aircraft, the aircraft having a rotary wing carried by the fuselage, the aircraft being provided with a lift surface fastened to the fuselage and constituted by a first half-wing and a second half-wing situated on either side of the fuselage, the aircraft having a first propulsion unit carried by the first half-wing and a second propulsion unit carried by the second half-wing, wherein each respective propulsion unit includes both a respective first propeller and a respective second propeller on a respective common axis that is offset transversely from the anteroposterior plane of symmetry, each generating thrust directed towards the front of the aircraft in a normal thrust mode of operation and thrust that is directed towards the rear of the aircraft in a reverse thrust mode of operation, the aircraft including propeller control means that act:

during hovering flight, to cause the first propeller and the second propeller of the first propulsion unit to operate in the reverse thrust mode of operation, and to cause the first propeller and the second propeller of the second propulsion unit to operate in the normal thrust mode of operation; and during forward flight, to cause the first propeller and the second propeller in each of the propulsion units to operate in the normal thrust mode of operation.

2. The aircraft according to claim 1, wherein the respective first and second propellers of one of the single respective propulsion units are arranged to be contrarotating.

3. The aircraft according to claim 1, wherein the respective first and second propellers of one of the single respective propulsion units are arranged to rotate in the same direction.

4. The aircraft according to claim 1, wherein the respective first and second propellers of one of the single respective propulsion units are situated on the same side of a of the respective half-wing.

5. The aircraft according to claim 1, wherein the respective first and second propellers of one of the single respective propulsion units are situated on opposite sides of the same half-wing.

6. The aircraft according to claim 1, wherein the rotary wing has a lift rotor that rotates in the clockwise direction when seen from above, and the first propulsion unit is situated on the right of the fuselage when seen from above, the second propulsion unit being situated on the left of the fuselage when seen from above.

7. The aircraft according to claim 1, wherein the rotary wing has a lift rotor rotating counterclockwise as seen from above, and the first propulsion unit is situated on the left of the fuselage as seen from above, the second propulsion unit being situated on the right of the fuselage as seen from above.

8. A method of optimizing the ground clearance (GS2) of a hybrid aircraft provided with a fuselage extending longitudinally along an anteroposterior plane of symmetry (PSYM) from the rear of the aircraft towards the front of the aircraft, the aircraft having a rotary wing carried by the fuselage, the aircraft being provided with a lift surface fastened to the fuselage and constituted by a first half-wing and a second half-wing situated on either side of the fuselage, the aircraft having a first propulsion unit carried by the first half-wing and a second propulsion unit carried by the second half-wing, the method being characterized by the following steps:

fitting each respective propulsion unit with a first propeller and a second propeller on a respective common axis, which propellers each generate thrust directed towards the front of the aircraft in a normal thrust mode of operation, and thrust that is directed towards the rear of the aircraft in a reverse thrust mode of operation;

during hovering flight, causing the first propeller and the second propeller of the first propulsion unit to operate in the reverse thrust mode of operation, and causing the first propeller and the second propeller of the second propulsion unit to operate in the normal thrust mode of operation; and during forward flight, causing the first propeller and the second propeller in each of the propulsion units to operate in the normal thrust mode of operation.

9. The method of claim 8, wherein the respective first and second propellers of one of the single respective propulsion units are arranged to be contrarotating.

10. The method of claim 8, wherein the respective first and second propellers of one of the single respective propulsion units are arranged to rotate in the same direction.

11. The method of claim 8, wherein the respective first and second propellers of one of the single respective propulsion units are situated on the same side of a respective half-wing.

12. The method of claim 8, wherein the respective first and second propellers of one of the single respective propulsion units are situated on opposite sides of the same half-wing.

13. The aircraft of claim 4, wherein the respective first and second propellers of the single respective propulsion unit are arranged either upstream from the leading edge of the respective half-wing, or downstream from the trailing edge of the respective half-wing.

14. A hybrid aircraft comprising:
a fuselage having a front, a rear, and a plane of symmetry extending from the front to the rear defining a first side and a second side;
a vertical main rotor carried by the fuselage;
a first half-wing coupled to the fuselage on the first side;
a second half-wing coupled to the fuselage on the second side;

a first propulsion unit carried by the first half-wing on the first side, the first propulsion unit including a first front propeller and a first rear propeller;

a second propulsion unit carried by the second half-wing on the second side, the second propulsion unit including a second front propeller and a second rear propeller; and a controller configured to, during hovering flight, control the first front propeller and first rear propeller to provide a reverse thrust and to control the second front propeller and second rear propeller to provide a forward thrust, and to, during forward flight, control the first front propeller, first rear propeller, second front propeller, and second rear propeller to provide forward thrust.

15. The hybrid aircraft of claim 14, wherein each respective propeller is driven by an associated engine.

16. The hybrid aircraft of claim 14, wherein the main rotor includes a plurality of rotor blades that, during rotation, advance on the second side and retreat on the first side.

17. The hybrid aircraft of claim 14, wherein the first front propeller and the first rear propeller have a first common axis of rotation and the second front propeller and the second rear propeller have a second common axis of rotation.

18. The hybrid aircraft of claim 17, wherein the first front propeller and the first rear propeller are driven in contrarotation about the first common axis of rotation.

19. The hybrid aircraft of claim 17, wherein the first front propeller and the first rear propeller are driven to rotate in a same direction about the first common axis of rotation.

20. The hybrid aircraft of claim 17, wherein the first half-wing has a leading edge and a trailing edge, and wherein the first front propeller is arranged upstream of the leading edge and the first rear propeller is arranged downstream of the trailing edge.

* * * * *